US005546819A

United States Patent [19]

Zodrow

[11] Patent Number: 5,546,819

[45] Date of Patent: Aug. 20, 1996

[54] BOTTLE INSPECTION MACHINE

[76] Inventor: Rudolf Zodrow, Lichtstrasse 37, 40235 Düsseldorf, Germany

[21] Appl. No.: 256,396

[22] PCT Filed: Jan. 13, 1993

[86] PCT No.: PCT/EP93/00053

§ 371 Date: Sep. 30, 1994

§ 102(e) Date: Sep. 30, 1994

[87] PCT Pub. No.: WO93/13879

PCT Pub. Date: Jul. 22, 1993

[30] Foreign Application Priority Data

Jan. 15, 1992 [DE] Germany .......................... 42 00 798.4

[51] Int. Cl.[6] ........................ G01M 19/00; G01N 21/90; B67C 03/22; B65G 43/08

[52] U.S. Cl. ................... 73/865.8; 73/863.91; 73/863.92

[58] Field of Search ............................ 73/863.91, 863.92, 73/865.8, 865.9

[56] References Cited

U.S. PATENT DOCUMENTS

| | | | |
|---|---|---|---|
| 3,916,694 | 11/1975 | Loos et al. | 73/865.8 |
| 4,574,646 | 3/1986 | Mattei et al. | 73/863.92 |
| 4,852,415 | 8/1989 | Bogatzki et al. | 73/865.8 |
| 4,858,768 | 8/1989 | Plester | 73/863.91 |
| 4,880,120 | 11/1989 | Myers et al. | 73/863.91 |
| 4,962,771 | 10/1990 | Neri et al. | 73/863.92 |
| 5,067,616 | 11/1991 | Plester et al. | 73/863.91 |
| 5,101,609 | 4/1992 | Cook | 73/865.8 |
| 5,297,434 | 3/1994 | Stell | 73/865.8 |
| 5,383,322 | 1/1995 | Collins et al. | 73/865.8 |

FOREIGN PATENT DOCUMENTS

| | | | |
|---|---|---|---|
| 2427054A | 1/1975 | Germany | 73/865.8 |
| 3324449 | 1/1985 | Germany . | |
| 4239203 | 12/1993 | Germany | 73/865.8 |
| 6148022A | 5/1994 | Japan | 73/865.8 |
| 0649982 | 2/1979 | U.S.S.R. | 73/865.9 |
| 9108468 | 6/1991 | WIPO | 73/865.8 |

OTHER PUBLICATIONS

*Vollinspektionsmaschine Alphatronic* [The Alphatronic Complete Inspection Machine], prospectus from Holstein & Kappert GmbH, AL/684.1.5d/Howa.

*Inspektionstechnik* [Inspection Technology] (5000 d Apr. 1987).

*Primary Examiner*—Richard Chilcot
*Assistant Examiner*—George M. Dombroske
*Attorney, Agent, or Firm*—Meltzer, Lippe, Goldstein et al.

[57] ABSTRACT

The present invention relates to a bottle inspection machine with a plurality of inspection sections (8–10) that are equipped to perform different inspection tasks and a sorting station (11) which, depending on the results of the inspection, releases the bottles to different conveyor sections (2–5). In order to provide functional control of the machine, a secondary conveyor section that is formed by a rotating bottle carrier (13) together with the inspection sections (8–10) forms a closed circuit into which test bottles (T) can be introduced from a magazine. The inspection sections (8–10) that are formed by rotating bottle carriers, like the bottle carriers (13) that form the secondary conveyor section, have receiving points for the bottles on their peripheries and during functional checking form a continuous row with their receiving points. In this way, a system test of the control systems can be carried out, even with the machine at high operating power, with very few test bottles (T), in particular if the test bottles (T) pass through the machine several times, without manual intervention.

13 Claims, 11 Drawing Sheets

Figure 1:
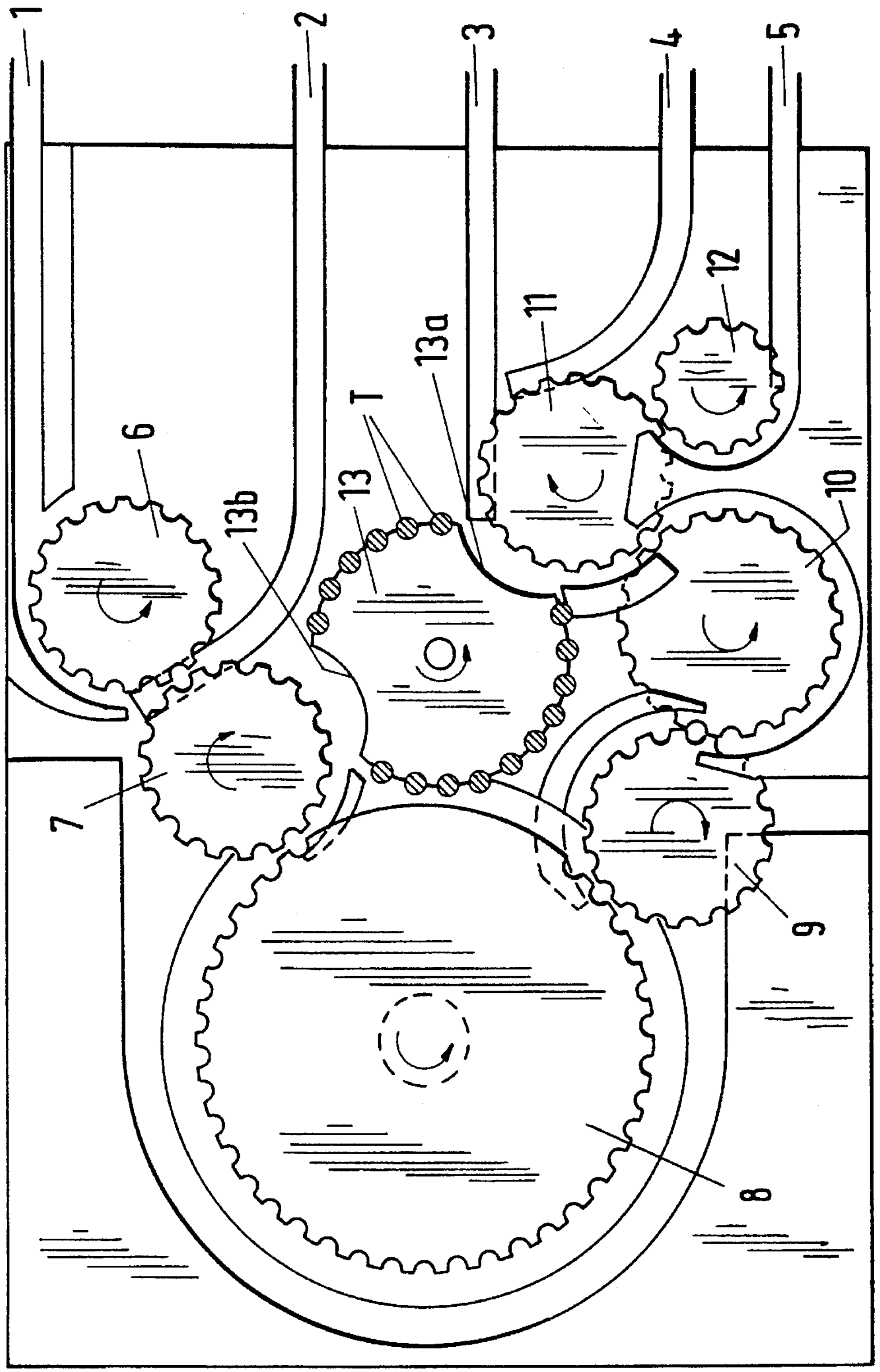

1
2
3
4
5
6
7
8
9
10
11
12
14
14a
I 1
2
3
4
5
6
7
8
9
10
11
12
21
21a
22
22a
22b
22c
22d
T
N

BOTTLE INSPECTION MACHINE

The present invention relates to a bottle inspection machine that has a plurality of inspection sections that are arranged one behind the other and are used for different inspection tasks such as monitoring for size and correct type, for monitoring the walls, opening, and bottom; for monitoring residual contents as well as the stoppers, in particular bail-type stoppers. The bottles are moved through these inspection sections by one or a plurality of rotating bottle carriers that are arranged one behind the other and which have on their peripheries receiving points for the bottles, when they are inspected. It also has a sorting station that is arranged at the end of the inspection sections and moves the bottles to different conveyor sections depending on the results of the inspections, and a magazine that can be connected to the inspection sections, from which test bottles can be introduced into the inspection sections and, in particular, can be removed from the inspection sections once again and returned to the magazine, it being possible to short-circuit the beginning and the end of the inspection sections through a secondary conveyor section, thereby forming a closed circuit for the test bottles.

In modern inspection machines that are used in practice (prospectus from Holstein & Kappert GmbH, *Vollinspektionsmaschine ALPHATRONIC* [The Alphatronic Complete Inspection Machine] AL/684.1.5d/Howa; prospectus from Krones GmbH, *Inspektionstechnik* [Inspection Technology] (5000 d 04/87), the systems used for the various checks are arranged on one or a plurality of inspection sections that are arranged one behind the other and formed from rotating bottle carriers with receiving points for the bottles on their peripheries. In order to carry out periodic checks on the correct operation of such systems, provision is made such that different test bottles can be introduced into the system, and the results of such inspections checked. It is customary that a large number of test bottles pass through the machine in order to complete such a system test. Since the test bottles are introduced by hand and the test bottles that are singled out at the end of the inspection sections have to be removed once again by hand, a considerable effort is required on the part of operating personnel.

The patent literature (DE-A1 33 24 449) describes a bottle inspection machine of the type described in the introduction hereto. In contrast to the inspection machines that are used in practice and which have been described, these are distinguished in that in this machine the bottles do not have to be introduced into the inspection sections by hand. In the case of this bottle inspection machine, which has a single rotating bottle carrier having receiving points arranged on its periphery and which delivers the bottles through an input side conveyor belt and removes them by way of an outlet side conveyor belt, and a conveyor belt branches off from the outlet side conveyor belt, and this opens out into the inlet side conveyor belt. Test bottles for a system test can be held at readiness on this conveyor belt. Thus, this conveyor belt forms a magazine for the test bottles. In order to be able to carry out a system test, test bottles are introduced into the inspection section with the barriers on the conveyor belt set in the appropriate positions and, after passing through the inspection machine, are returned from the outlet side conveyor belt onto this conveyor belt. The test bottles can pass through the inspection machine several times. An additional return of the test bottles is effected by way of an additional secondary conveyor section that starts from the rotating bottle carrier and includes a sorting station and opens out into the first secondary conveyor section. Thus, during a system test, a distinction is made between flawed and unflawed bottles and the flawed bottles are returned to the circuit through the sorting station. When this is done, it is important that in the case of the flawed and the unflawed bottles an originally established sequence of unflawed and flawed bottles is disrupted. In the case of a repeated passage, the test results are thus no longer comparable, i.e., accurate replication is not possible with this machine. A further disadvantage of this machine is that because of the type of return transport and the introduction of the test bottles into the inlet side conveyor section, a system test cannot be conducted at the highest possible operating power of the machine.

It is the task of the present invention to create a bottle inspection machine with which an automatic system test can be carried out with test bottles under operating conditions and at a high level of accuracy.

This task has been solved using a bottle inspection machine of the type described in the introduction hereto, such that the secondary conveyor section is formed as a rotating bottle carrier with receiving points for the test bottles on its periphery and, in the short circuited state, the receiving points of the bottle carrier that forms the secondary conveyor section and of the other bottle carrier(s) forming the inspection sections form a continuous chain of receiving points for the test bottles.

The bottle inspection machine according to the present invention is made up of identical elements that are chained to each other, these being rotatable bottle carriers with receiving points that are arranged on their peripheries, these then forming a continuous chain of receiving points. This satisfies the prerequisite that the test bottles are optimally guided along their total path in the circuit. In this way, the system test can be carried out at maximum operating power of the machine. Because the bottles are moved in a continuous chain, their path through the machine can be followed precisely. It is an additional advantage that because the end and the beginning of the inspection sections are joined through a secondary conveyor section that is in the form of a rotatable bottle carrier it is possible to carry out the test with a smaller number of test bottles.

The inspection results that are generated by the individual inspection elements of the inspection machine are processed by a computer that determines the inspection result of each individual test bottle at the individual inspection elements for each passage so that, after one or a plurality of passages through the machine, it is possible to state whether or not the individual inspection elements have detected all the faults or which faults they have not detected.

Since, in the present invention, the bottles can be so guided in a closed circuit that the sorting station does not necessarily have to be incorporated in the circuit, it is also ensured that the sequence of unflawed and flawed test bottles that has been set up is retained for each passage through the machine. This means that the test results obtained from the individual passages can be compared with each other. This is particularly important for accurate testing of the different receiving points with their associated handling elements for the bottle because in the case of several passes, each receiving point can be checked for different test bottles.

It is particularly advantageous if, according to one configuration of the present invention, the number of receiving points in the circuit is a multiple of the number of receiving points of the bottle carrier that comprises the secondary conveyor section. In this configuration of the invention if the bottle carrier that is configured as the secondary conveyor section assumes the function of the magazine, then no additional empty places in the magazine are necessary in order to accommodate the test bottles that are returned into the magazine.

In order to make the engagement of the secondary conveyor section that is formed as a rotating bottle carrier with a fixed axis of rotation as simple as possible, on the periphery of the bottle carrier, in the area of its receiving points, there is at least one recess; when the magazine is stationary and out of the circuit, i.e., during normal inspection operation, this recess permits the unhindered movement of bottles from the inlet of the machine into the inspection sections and from the inspection sections to the outlet at the transfer points between the secondary conveyor belt and the inspection sections. However, it is also possible to make the secondary conveyor section that is configured as a rotating bottle carrier adjustable with reference to its axis of rotation, so that it can be switched in and out of the circuit.

In another, alternative, version, the functions of the secondary conveyor section and the magazine are separate. In this case, the magazine can be connected to the secondary conveyor section that is configured as a rotatable bottle carrier with a fixed axis of rotation; the distribution of its receiving points corresponds to the distribution of the receiving points of the inspection sections and are driven simultaneously and synchronously with the receiving points in the secondary conveyor section. In this way, the bottle carrier can always run with the other bottle carriers. Whether the short circuit will be formed through it depends solely on how the retaining and transfer means provided at the transfer point are positioned. In this configuration of the present invention, it preferred that the magazine and the receiving points form a circular section.

In inspection machines, it is customary that at each of the receiving points of the rotating bottle carrier that is used there are separate retaining and transfer means for the bottles. In order to ensure the correct transfer from the bottle carriers of the inspection section and the secondary transfer sections, and vice versa, it must be possible to release the retaining and transfer means that are involved in this transfer individually. This is costly, and the control procedures that are required to do it affect the potential throughput of the machine.

The problems described above can be solved very simply in the apparatus according to the present invention in that switches (points) that can be reset are provided at least four points in the inspection sections, at the transfer points to the secondary conveyor sections; in the first position of the switches, the test bottles move from the secondary conveyor section into the inspection sections; in the second position of the switches, the inspection sections are short-circuited and the bottles are moved on the inspection sections via the secondary conveyor section back into the inspection sections; in the third position, the test bottles move out of the inspection sections into the secondary conveyor section and remain in it; finally, in the fourth position, the bottles pass into the inspection sections on the secondary section.

If a large number of bottles are to be accommodated in the magazine that is formed by a bottle carrier, the switches can be so configured that they can be rotated into a fifth position in which the bottles are kept in the secondary section. In this way, the bottles in the bottle carrier can be kept in the circuit until all the test bottles have reached their prescribed rest position during normal inspection operation.

Given such a configuration of the present invention, in order to be transferred from the inspection sections to the secondary conveyor section, the bottles no longer have to be released or retained individually by the retaining devices of the bottle carrier that is involved. Instead, they will be guided positively depending on the position of the switches.

Since it is no longer necessary to activate the retaining devices individually for the transfer, simply configured holders can be used in the bottle carriers. In addition, the switches have to be moved from the normal inspection operation to the short-circuited checking status of the machine only at the beginning and the end of the changeover, so that the machine output is not affected during the check itself.

Thus, the control technology that is required to switch the inspection device and the production technology that is required to manufacture the inspection device can be reduced to a minimum. This leads to reduced manufacturing and maintenance costs.

A configuration of the switches that is appropriate in practice is characterized in that each switch consists of two parts that are arranged one behind the other in the direction in which the bottles move and which can be set independently of each other; these parts can each pivot about a fixed point of rotation. The guide surfaces of the switches that are associated with the secondary conveyor section should incorporate a curvature that is identical to the curvature of the secondary conveyor section and the guide surfaces that are associated with the inspection sections should incorporate a curvature that is identical to the curvature of the inspection sections. Furthermore, it is useful if, ahead of and/or behind the transfer points from the inspection sections to the secondary conveyor section there are fixed guides that facilitate the entry and departure of the bottles in the transfer area. This, too, should incorporate a curvature that matches the curvature of each conveyor section that is associated with them.

Retaining devices in the bottle carriers can be dispensed with entirely if the exposed sides of the secondary conveyor section are defined by guide rails and it is not necessary that the test bottles be held in a specific rotated position.

In order to be able to carry out a complete and automatic system test when the inspection machine is operating, the bottle inspection machine is fitted with an automatic control system with a bottle barrier at the inlet and a power control which, after activation of the bottle lock, reduces the power of the machine, and a throughput control at the output which, when there is no flow of bottles, sends a signal to the automatic control system, by means of which the automatic control system initiates insertion of the test bottles from the magazine and the closing down of the circuit, and after at least one single passage of the test bottles initiates ejection of the test bottles from the circuit into the magazine, after which the automatic control system opens the bottle lock and sends a signal to the power control system to increase the power of the machine. When this is done, the automatic control system preferably takes the magazine out of circuit once it has been refilled.

Figure 2:
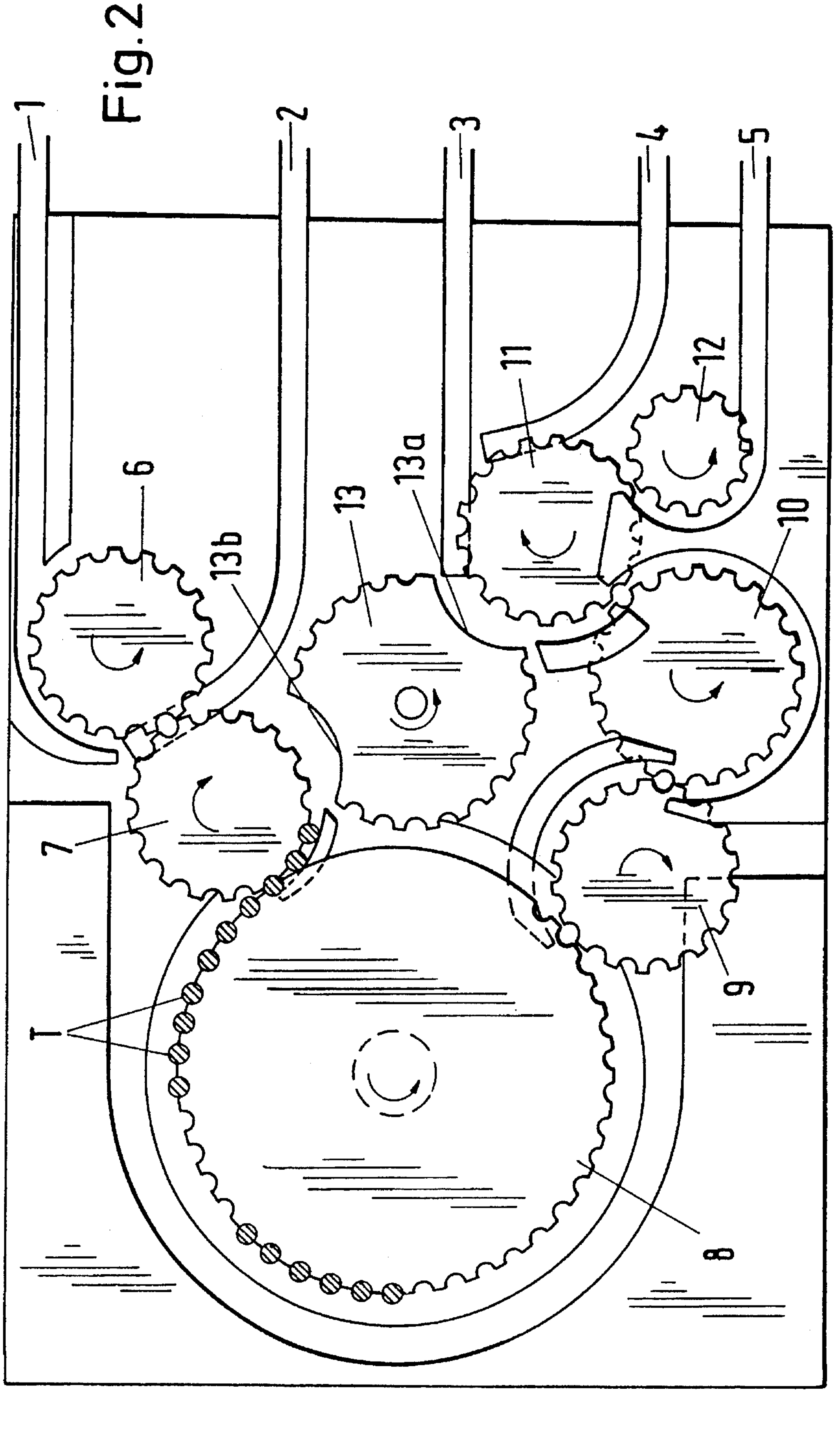
Figure 3:
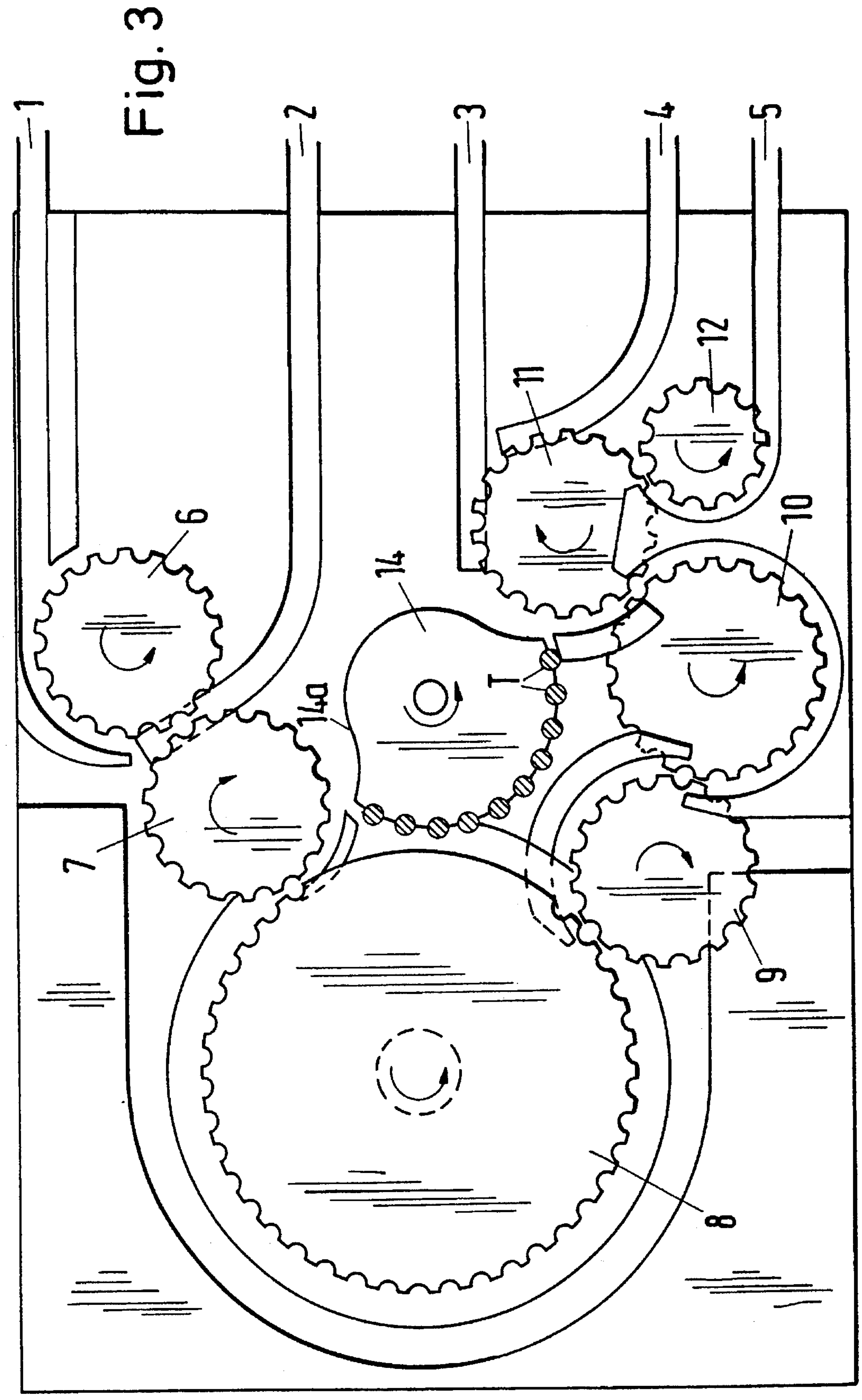
Figure 4:
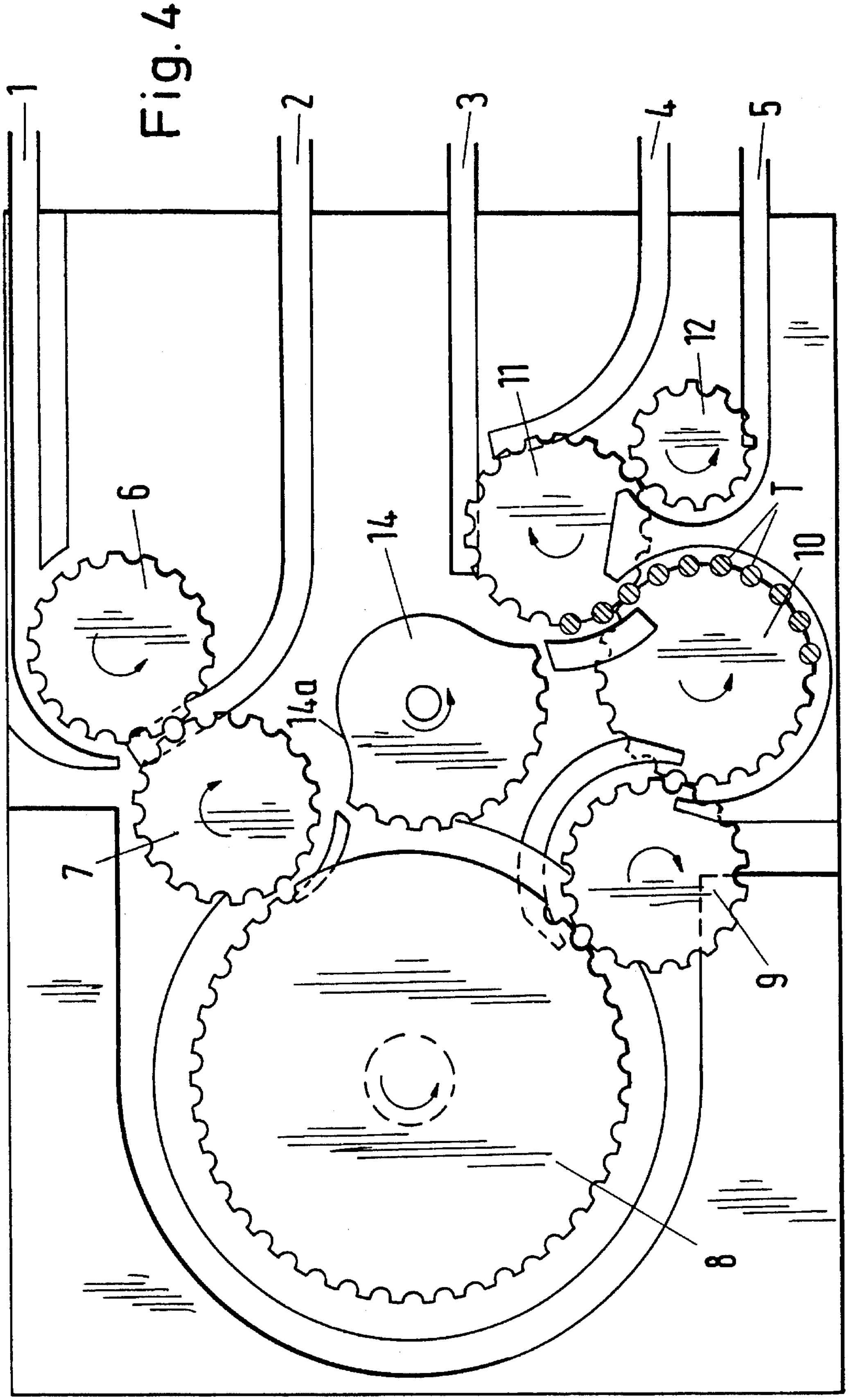
Figure 5:
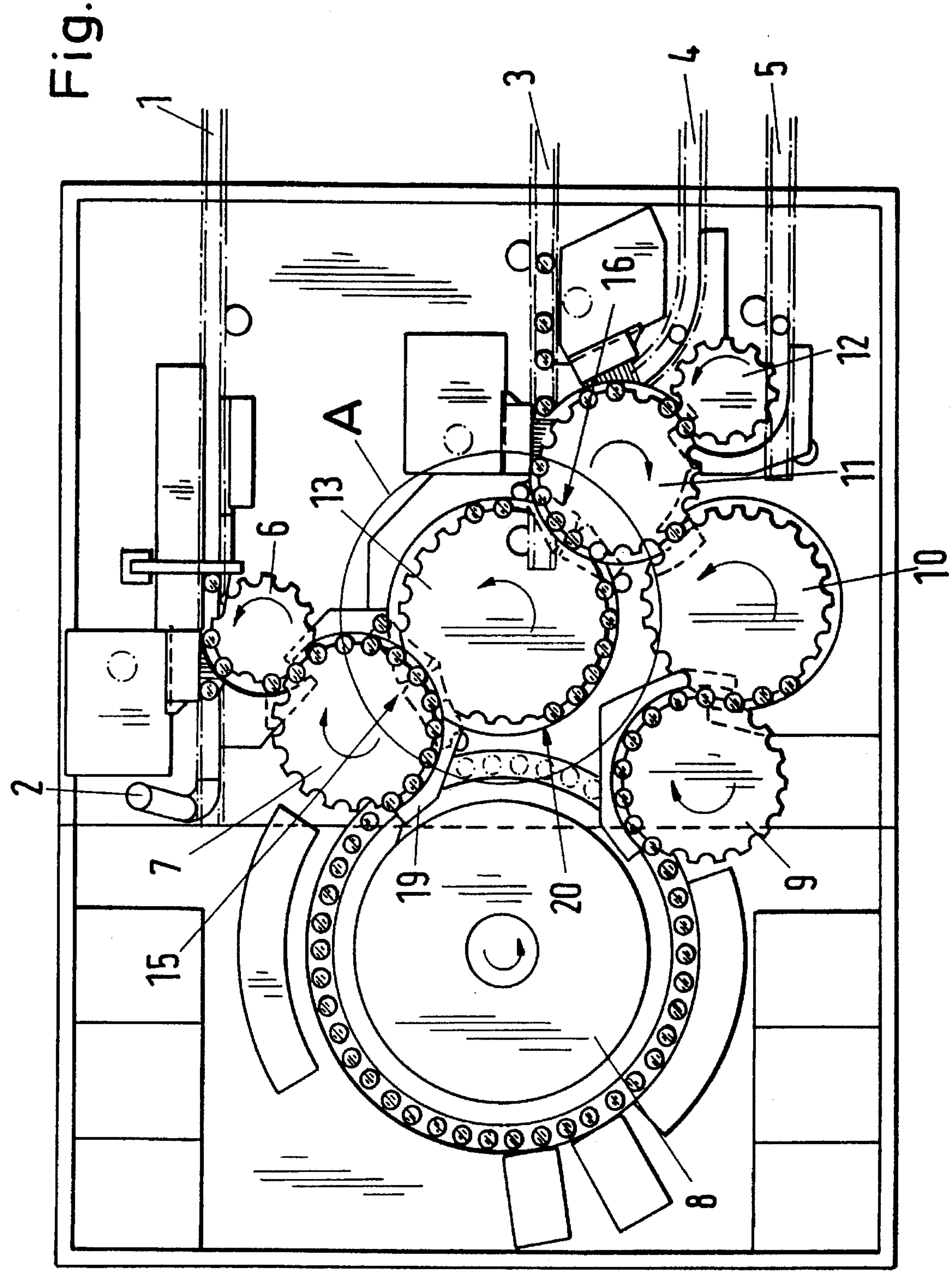
Figure 5A:
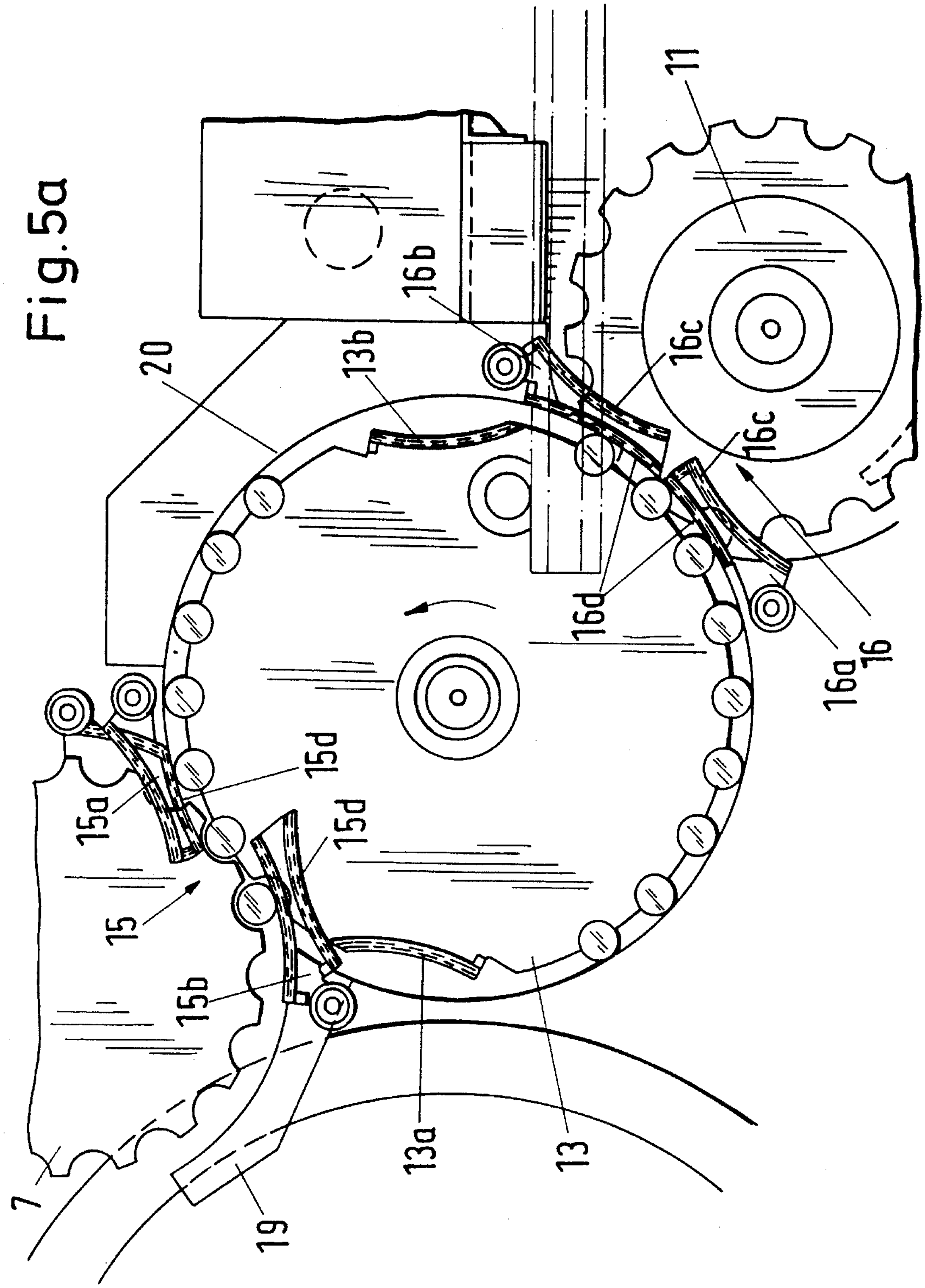
Figure 5B:
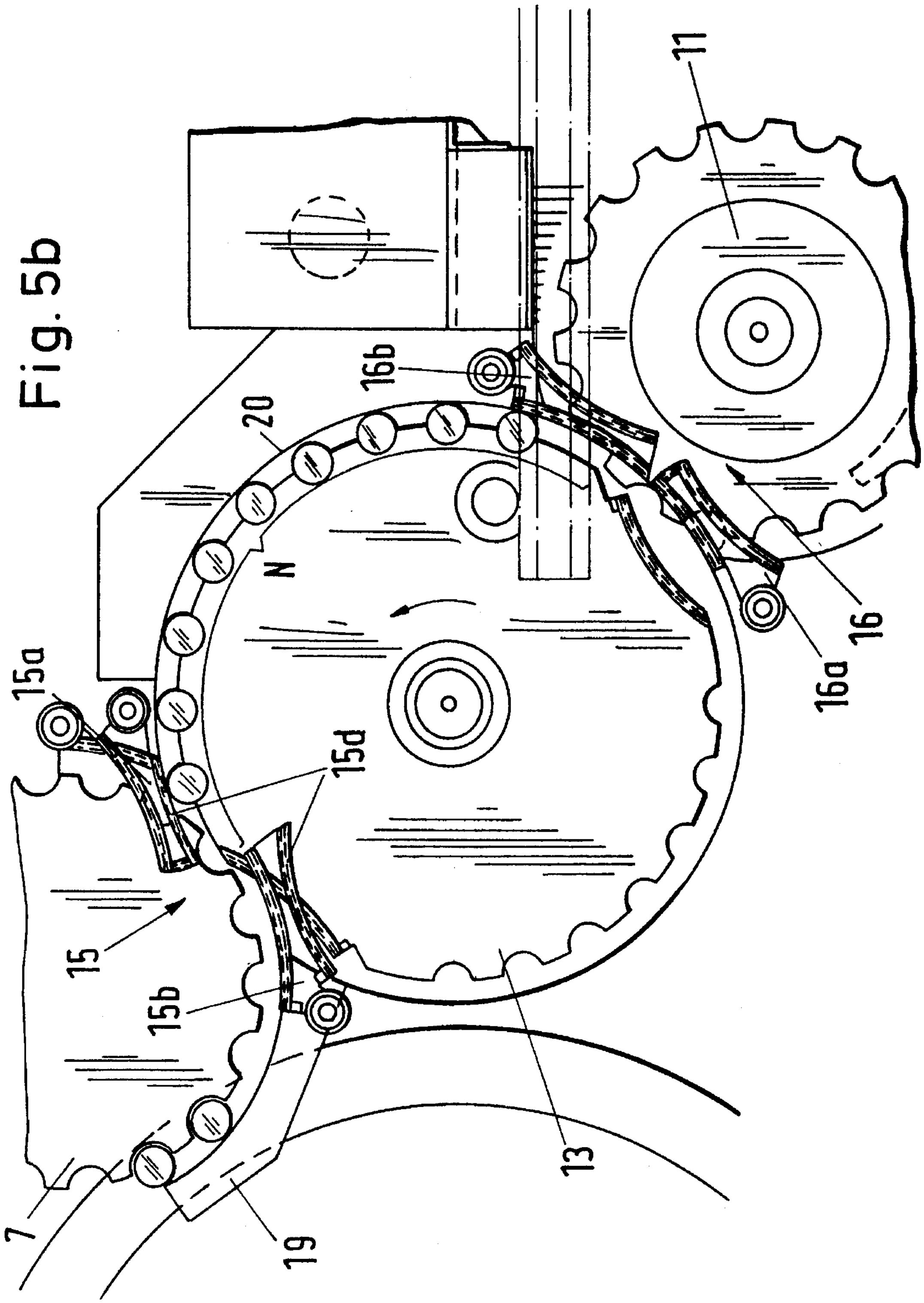
Figure 5C:
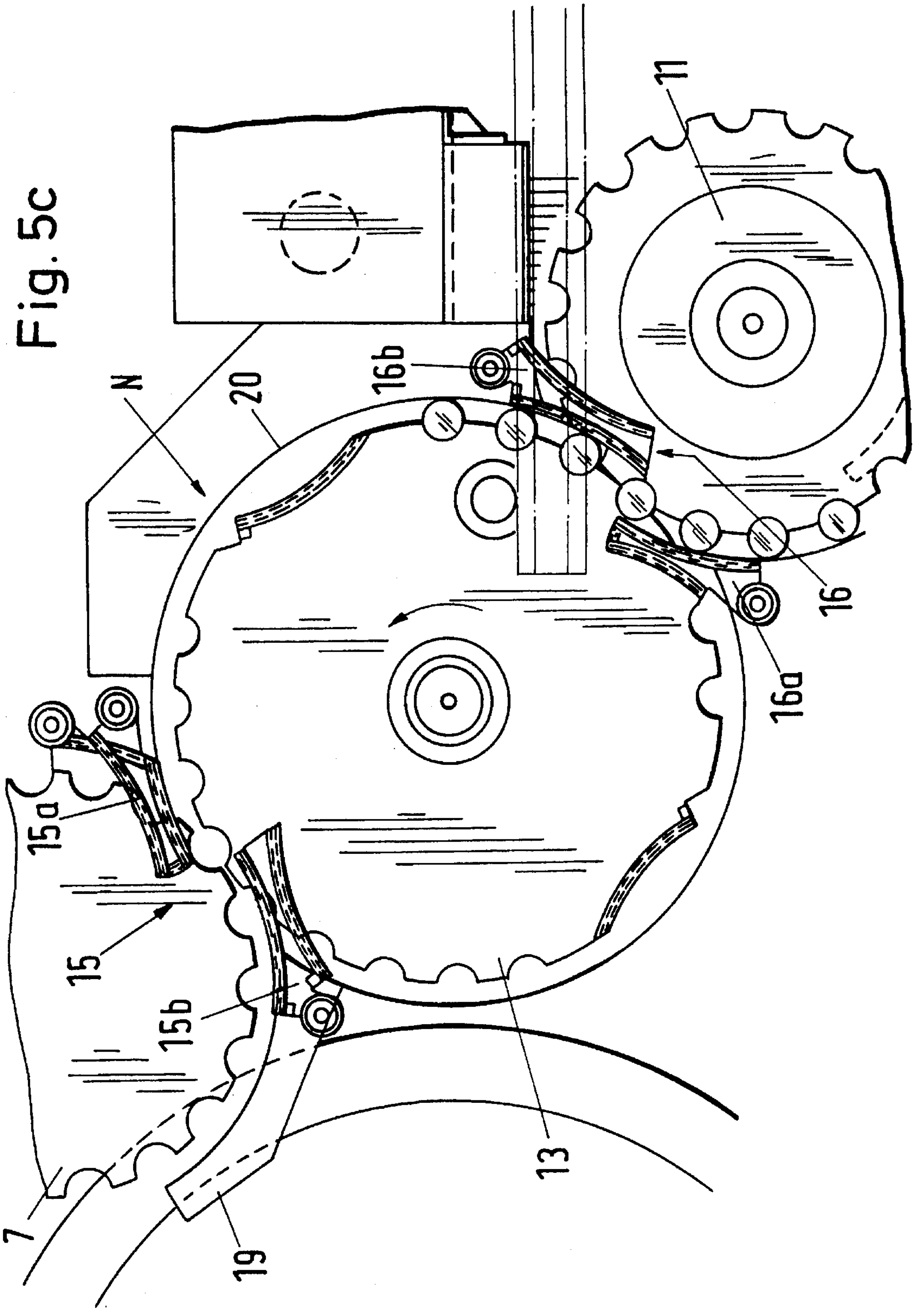
Figure 5D:
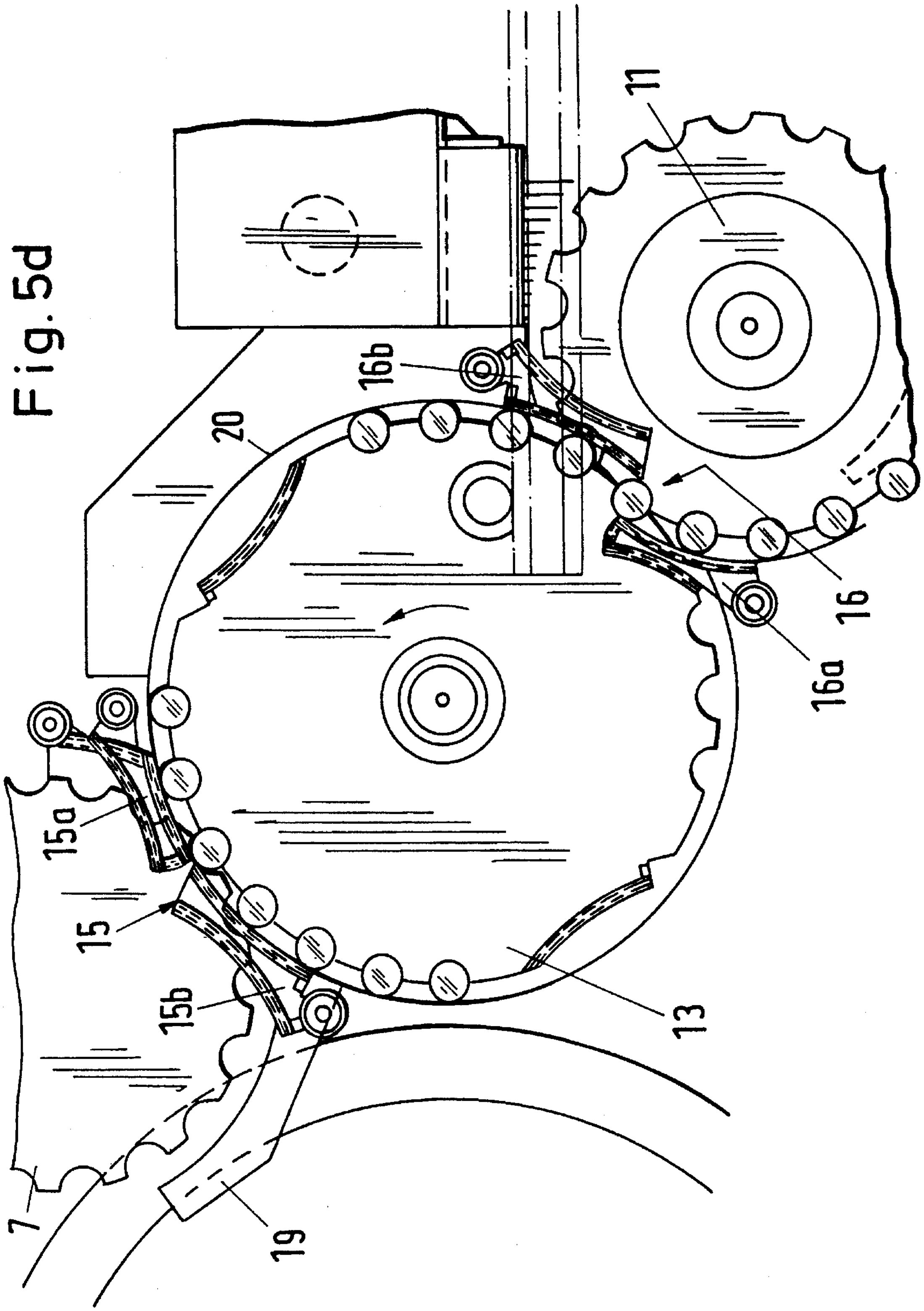
Figure 5E:
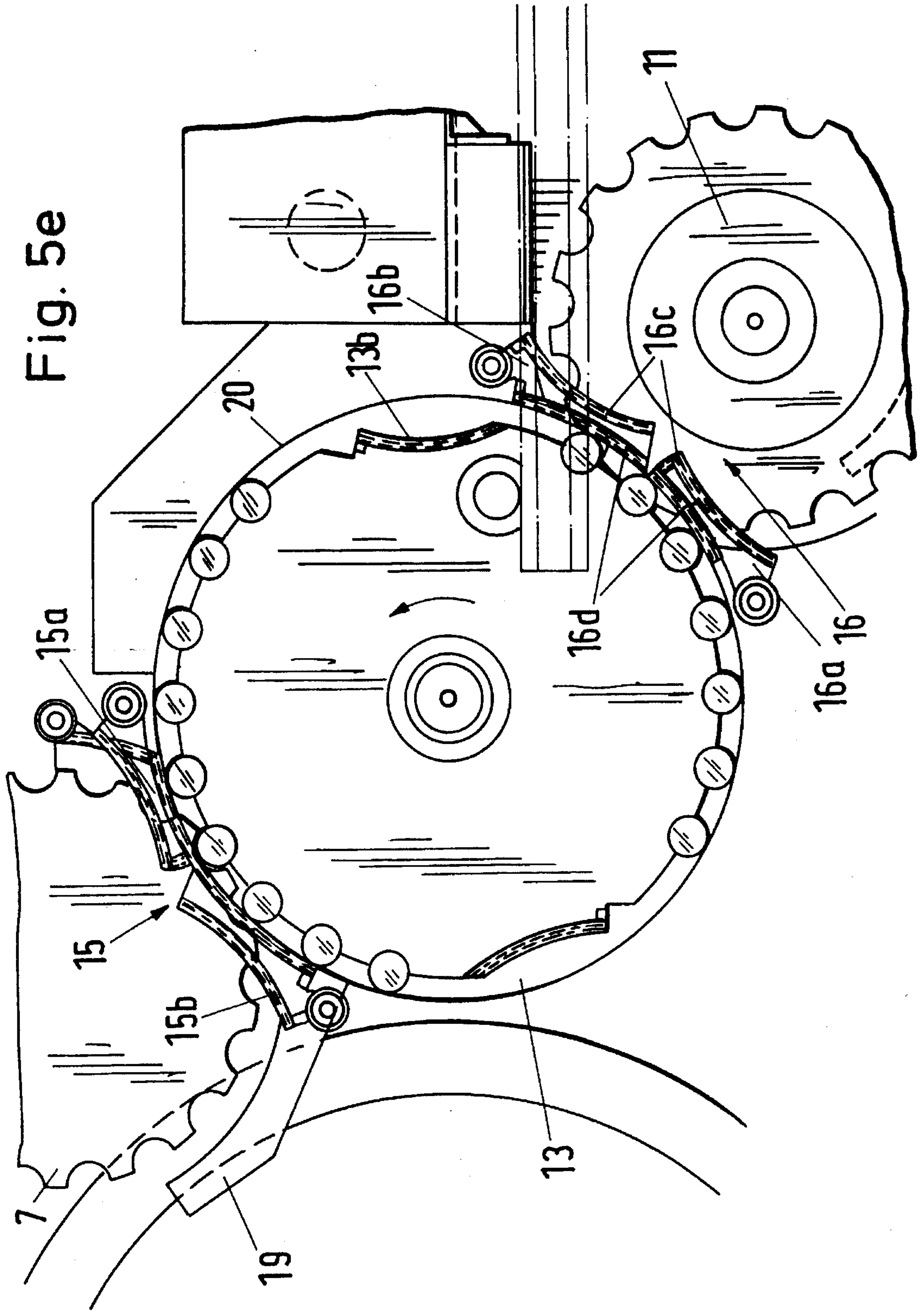
Figure 6:
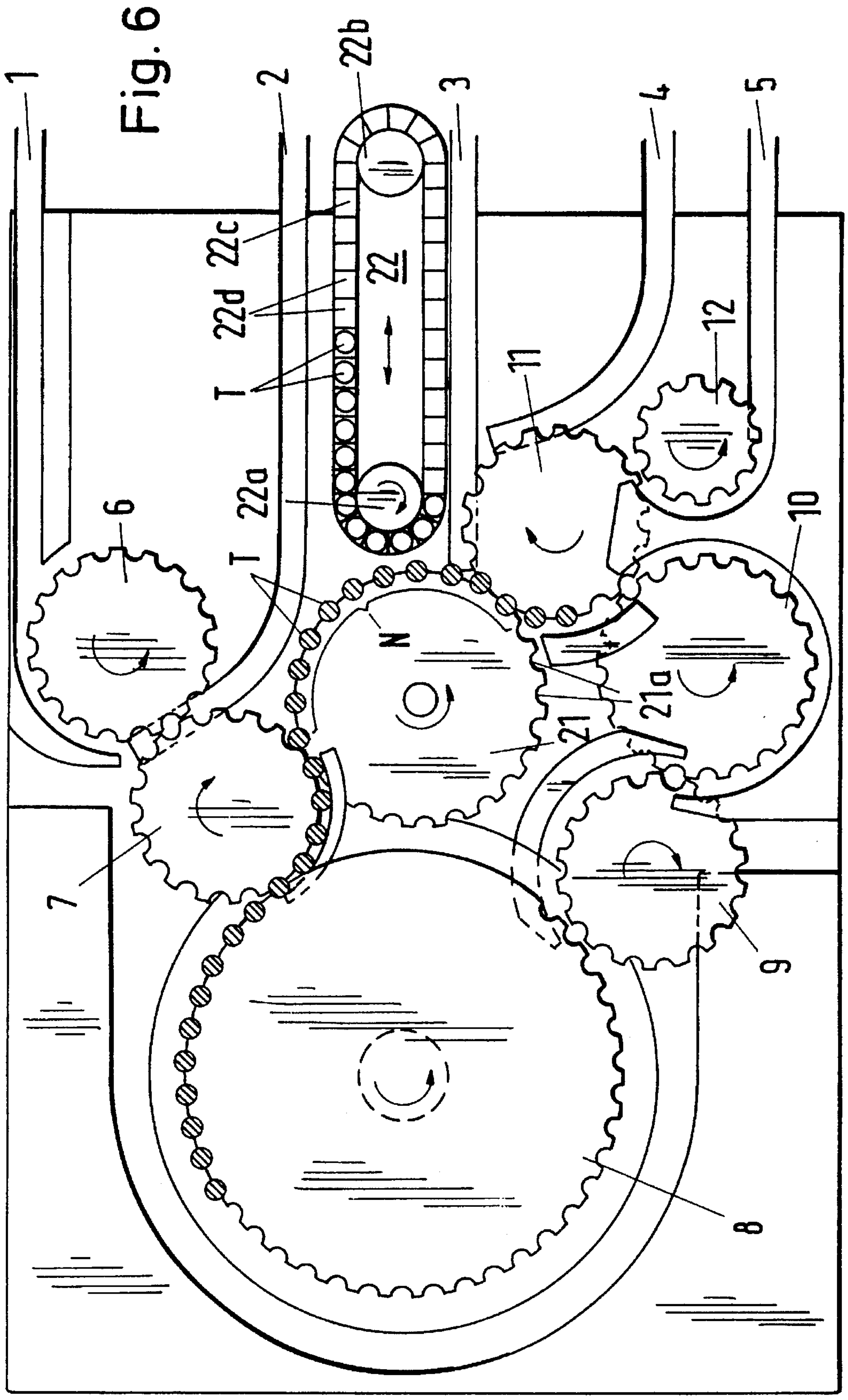

The present invention will be described in greater detail below on the basis of three embodiments of bottle inspection machines that are shown diagrammatically in plan view in the drawings appended hereto. These drawings show the following:

FIG. 1: a bottle inspection machine with the secondary conveyor section not engaged;

FIG. 2: the bottle inspection machine as in FIG. 1, with the secondary conveyor section engaged;

FIG. 3: a bottle inspection machine with the secondary conveyor section not engaged, in a different embodiment to FIG. 1;

FIG. 4: the bottle inspection machine as in FIG. 3, with the secondary conveyor section engaged;

FIG. 5: an embodiment of the bottle inspection machine in which resettable switches are arranged at the transfer points between the inspection sections and the secondary conveyor section;

FIGS. 5*a–e*: an enlarged view of the section A as in FIG. 5 that shows different positions of the switches;

FIG. 6: a bottle inspection machine with a secondary conveyor section engaged, in a further embodiment of the present invention.

Whereas the two embodiments of the bottle inspection machine shown in FIGS. 1 to 5 differ from each other only slightly with respect to their secondary conveyor sections and their test bottle magazine, the embodiment of the bottle inspection machine that is shown in FIG. 6 differs significantly from the two previous embodiments. However, common to all these embodiments is the principle that test bottles can be moved from a test bottle magazine into a closed circuit and then returned to the magazine from this closed circuit.

In all of the embodiments, the bottles that are to be inspected move through an inlet formed by a conveyor belt 1 into the inspection machine and leave the machine by way of conveyor belts 2, 3, 4, 5, depending on the results of the inspection. Between the outlet side conveyor belts 2 to 5, there are a plurality of bottle carriers 6, 7, 8, 9, 10, 11, 12 arranged one behind the other, by which the bottles that are to be inspected are moved. These bottle carriers 6, 7, 8, 9, 10, 11, 12 are formed in the manner known per se as rotary stars or rotary tables, with receiving points arranged on their peripheries, and are so connected and driven that a self-contained row of bottles can be moved through the section that they form.

The individual rotary stars or rotary tables are equipped to carry out different inspection tasks and, optionally, to orient the bottles, for example, bottles with bail-type stoppers. Such devices are similarly known per se. Thus, the inlet side bottle carrier 6 is fitted with devices to check errors in height and check for the correct bottle type. The bottle carrier 7 is in the form of a suction star. The suction devices that are controllable and are associated with the individual receiving points are so controlled, as a function of the results obtained from the device used to check bottle type and height in bottle carrier 6, that only bottles without such faults are taken over from the bottle carrier 7, whereas incorrect bottle types and bottles that are of the incorrect height are passed to the conveyor 2.

The bottle carrier 8 is equipped to inspect bottles having bail-type stoppers. During the inspection of such bottles, in comparison to other bottles, it is also necessary to check the bail-type stopper and move the bail-type stopper into a position in which it does not interfere with inspection of the walls of the bottle. For this reason, it is necessary to have a comparatively long section in order to ensure this orientation and handling of the bottle, and for purposes of the inspection itself. When this is done, conventional inspection devices are used on the bottle carrier 8 to orient the bottle with a bail-type stopper and its stopper, as well as for inspecting the bail-type stopper, side walls, and the neck of the bottle on the bottle carrier 8.

The bottles that have been inspected in this way are moved whilst retaining their rotated position through the bottle carrier 9 onto the bottle carrier 10, where there are devices to check the mouth and bottom of the bottle and to check it for residual liquid content. All inspections are carried out after passage through the bottle carrier 10.

The inspection results obtained for the individual bottles are stored so that the individual bottles can then be moved to the appropriate conveyor belt 3, 4, 5. A bottle carrier 11 that is configured as a suction star is adjacent to the bottle carrier 10, and this forms a sorting station. The suction devices that are associated with the individual receiving points are so controlled as a function of the inspection result that bottles that have glass faults are moved onto conveyor belt 3, bottles with stopper faults and with faults related to residual liquid content are moved onto conveyor belt 4, and unflawed bottles are moved through the bottle carrier 12 that is configured in the form of an intermediate star and then onto the conveyor belt 5.

Between the bottle carrier 7 and the bottle carrier 11 there is a magazine 13, 14 that is in the form of a bottle carrier with receiving points arranged around its (periphery); the inspection sections of the bottle carriers 7, 8, 9, 10 can be short-circuited to form a closed circuit and so as to exclude the sorting station of the bottle carrier 11. When this is done, part of the transport path of the bottle carrier that forms the magazine 13, 14 forms a secondary conveyor section N. In the example that is shown in FIGS. 1 and 2, the magazine 13 has two groups of receiving points, and the magazine 14 that is shown in the embodiment illustrated in FIGS. 3 and 4 has one group of receiving points. The positional circles of the receiving points of the bottle carrier 7, 11, 13, 14 touch each other so that at the points that are tangent to each other the bottles can be transferred from the bottle carrier 13, 14 that forms the magazine onto the bottle carrier 7 or can be moved from the bottle carrier 11 into the magazine. In order that undisrupted movement of bottles through the bottle carriers 7, 11 past the bottle carrier 13, 14 is possible when the bottle carrier 13, 14 is stationary, despite the positional circles touching each other, the bottle carrier 13, 14 has on its periphery, in the area of the receiving points, the recesses 13*a*, 13*b*, 14*a*, and these lie in the area of the positional circles that are tangent to each other when the bottle carrier 13, 14 is stationary.

The inspection machine described above operates in the following manner:

In order to provide for fully automatic operation of the system, the machine is fitted with an automatic control system. After the automatic control system has been switched on, the delivery of bottles that are to be inspected is stopped on the conveyor belt 1 by means of a barrier. As soon as the last bottle that is still in the machine has left the machine by way of the outlets 2 to 5, a power control system reduces the power of the machine. When the machine is running at low power the test bottle magazine 13, 14 is engaged. Switches 15, 16 are arranged [on the] secondary conveyor section N that is formed. Each of the switches 15, 16 consists of two parts 15*a*, *b*, 16*a*, *b*, that can be pivoted into at least two positions independently of each other; they are arranged in pairs opposite to each other in the direction of movement of the bottles. The side walls 15*c*, 16*c* of the parts 15*a*, *b*, 16*a*, *b*, that are associated with each of the inspection sections have the identical curvature as the inspection sections at this point. In exactly the same way, the walls 15*d*, 16*d* that are opposite the walls 15*c*, 16*c* are of a curvature that matches the curvature of the secondary conveyor section N at the transfer point. Behind the transfer point 17 at the end of the secondary conveyor section N there is a fixed guide 19 that facilitates the unhindered insertion of the test bottles T into the closed circuit. The magazine 30 has a guide rail 20 that encloses the exposed area of its periphery.

The inspection machine that has been described above operates in the following manner:

In order to provide for fully automatic operation of the system, the machine is fitted with an automatic control system. Once the automatic control system has been switched on, the delivery of bottles that are to be inspected is first stopped on the conveyor belt 1 by means of a barrier. As soon as the last bottle that is still in the machine has left the machine through the outlets 2 to 5 a power control system reduces the power of the machine.

When the machine is running at low power, the test bottle magazine 13 is engaged. The test bottles T that are shown in the magazine in FIGS. 1 and 3 move onto the bottle carrier 7 and are inserted into the test sections. FIGS. 3 and 4 show the test bottles T on these test sections. The bottle carrier 11 that is used in the inspection machine shown in FIGS. 1 to 3 as a controlled suction star, and which also serves as a sorting station, is so controlled that the incoming test bottles T are once again returned to the magazine 13, 14. The test bottles can be passed to the test sections once again from the magazine 13, 14. This forms a closed circuit. The bottles can pass through this circuit several times. During the test, the power of the machine is increased by the power control system so that the tests can be carried out in the shortest possible time and under operating conditions for high throughput. At the end of the test, the power of the machine is reduced once again and the magazine 13, 14 is once again filled with the test bottles. The bottle barrier at the inlet to the machine is opened and the power of the machine is increased once again.

Including the actual and the missing receiving points of the bottle carrier 13, 14 that forms the magazine between the transfer points of the bottle carrier 7, 13, 11 results in a number of receiving points for the circuit that is a multiple of the number of actual receiving points of the bottle carrier 13 and the missing receiving points in the area of the recesses 13*a*, *b*, 14*a*. In the embodiment shown, the circuit contains 72 receiving points. The number and arrangement of actual and missing receiving points of the bottle carriers 13, 14, 24 is so selected that the test bottles in the bottle carrier 13, 14 that forms the magazine are moved into these same receiving points of the magazine after each passage once again and fill it. Because of the fact that the closed circuit is formed whilst excluding the sorting station of the bottle carrier 11, it is ensured that the sequence of unflawed and flawed bottles in the row of test bottles T is maintained during each passage. In this way, the test results obtained from the individual passages can be compared and a high level of replication accuracy is obtained. Because of the fact that during a repeated passage, on the basis of the behaviour of the test bottles that are introduced and the receiving points of the circuit, it is possible to ensure that the individual test bottles always move into other receiving points, the function of each individual receiving point can be checked with different test bottles.

In contrast to the machine that is shown in FIGS. 1 to 4, in the inspection machine that is shown in FIGS. 5 and 5*a–e*, the operating state is determined by means of the switches 15, 16 that are arranged in the area of each transfer point at the end 17 and the start 18 of the secondary conveyor section N that is formed by part of the path of movement of the magazine 13. The switches 15, 16 each consist of two parts 15*a*, *b*, 16*a*, *b*, that can be pivoted into at least two positions independently of each other; these are in each instance arranged in pairs in the direction of movement of the bottles so as to be opposite each other. The side walls 15*c*, 16*c* of the parts 15*a*, *b*, 16*a*, *b*, that are associated with each inspection section are of the identical curvature as the inspection sections at this place. In exactly the same way, its wall 15*d*, 16*d* that is opposite the wall 15*c*, 16*c* is of the same curvature as the curvature of the secondary conveyor section N at the transfer point. After the transfer point 17, at the end of the secondary conveyor section N, there is a fixed guide 19 that facilitates the smooth introduction of the test bottles T into the closed circuit. The magazine 30 incorporates a guide rail 20 that passes around the exposed area of its periphery.

The FIGS. 5*a–e* show the different operating positions of the switches 15, 16. At the beginning of the testing operation (FIG. 5*a*, *b*) the part 15*a* of the switch 15 that is first in the direction in which the bottles move is pivoted in the direction of the bottle carrier 7, whereas the other part 15*b* is pivoted in the direction of the magazine 13. This means that the transfer point 17 at the end of the secondary conveyor section is opened and the test bottles T will move into the receiving points on the bottle carrier 7, along the side walls 15*d*, *c* of the parts 15*a*, *b* as the magazine 13 rotates. At the same time, the second switch 16 is in a closed position such that the remaining test bottles T move past it to the transfer point 17. These positions of the switches 15, 16 are maintained until all the test bottles T have been moved out of the magazine 13.

Next (FIG. 5*c*) the switch 16 is opened in that its first part 16*a* is pivoted in the direction of the magazine 30 and its other part 16*b* remains in its former position, with the result that the test bottles T are moved once again into the secondary section N. From this moment on, the inspection sections are short-circuited through the secondary conveyor sections. This position of the switches 15, 16 is maintained until the testing of the machine has been concluded.

Then, in order to refill the magazine with the test bottles T (FIG. 5*d*), the switch 15 is closed in that the part 15*b* is also pivoted in the direction of the bottle carrier 7. In this way, the test bottles T are held in the magazine 13. Once all the test bottles have moved into the magazine (FIG. 5*e*) the switch 16 is also moved once more into the first closed position. This state is maintained until the magazine 30 is in the resting position in which the recesses 13*a*, *b* face the particular bottle carrier 7, 11. Finally, the switches 15, 16 are then pivoted from the area of the inspection sections into their second closed position, in that their two parts are each rotated in the direction of the magazine 30 so that the normal bottles that are to be inspected pass the transfer point 17, 18.

In contrast to the embodiments discussed above, in the embodiment shown in FIG. 6, the rotating bottle carrier 21 that forms the secondary conveyor section N for the short circuit is provided with receiving points 21*a* around all of its periphery. This bottle carrier 21 rotates continuously synchronously and at equal speed with the other bottle carriers, in particular the adjacent bottle carrier 7, 11. This bottle carrier 21 has the sole task of forming the secondary conveyor section N for the closed circuit. A magazine 22 is associated with the bottle carrier 21 and this consists of a cellular chain 22*c* with receiving points 22*d* for the test bottles T that are formed from the cells, the whole running over guide rollers 22*a*, 22*b*. The distribution (interval) of the receiving points 22*d* corresponds to the way the bottle carrier 21 is divided. The cellular chain 22*c* can be driven synchronously and in the same direction as the bottle carrier 21. In order to transfer test bottles from the receiving points 22*d* of the test bottle magazine 22 into the receiving points of the bottle carrier 21, the test bottle magazine 22 is shifted in the direction of the bottle carrier 21. The bottles are taken over in the usual way by means of grippers or suction devices that are arranged at the receiving points of the bottle carrier 21. These grippers or suction devices also serve to ensure that, during a test run, the test bottles are taken over by the bottle carrier 11 and do not move into the outlet 3.

The fully automatic operation of the system using the embodiment shown in FIGS. 4 and 6 is in principle the same as in the other machines. There are differences, however, in the manner in which the test bottles T are fed into the closed circuit and, in the case of the machine shown in FIG. 6, are removed from it and into the magazine 16.

I claim:

1. A bottle inspection machine comprising:

an inlet for bottles to be inspected;

a plurality of outlet-conveyor sections for the bottles after they have been inspected;

a plurality of inspection sections located between the inlet and the outlet-conveyor sections and arranged one behind the other, the bottles passing through said plurality of inspection sections being inspected for a variety of properties;

a plurality of rotating bottle carriers having peripheries configured as receiving points for the bottles passing through said bottle inspection machine, said plurality of rotating bottle carriers transporting the bottles through the plurality of inspection sections;

a sorting station located after a last of said plurality of inspection sections, said sorting station passing the bottles which have passed through said inspection sections to different ones of said plurality of outlet-conveyor sections depending on the results of the inspection;

said plurality of rotating bottle carriers and said sorting station forming a primary conveyor section for the bottles passing through said bottle inspection machine;

a closed circuit secondary conveyor section comprising said plurality of rotating bottle carriers and a magazine which holds a plurality of test bottles used to calibrate said bottle inspection machine;

said magazine including at least one rotating test bottle carrier having a plurality of receiving points at its periphery for holding said test bottles;

wherein said secondary conveyor section is switchable between an open state wherein said rotating test bottle carrier is disengaged from said plurality of inspection sections, and a closed state wherein said rotating test bottle carrier passes said test bottles to a first of said plurality of rotating bottle carriers and receives said test bottles from a last of said plurality of rotating bottle carriers of said primary conveyor section thereby bypassing said sorting station, the test bottle receiving points and the receiving points of the plurality of rotating bottle carriers forming a continuous chain of receiving points for the test bottles in said closed state.

2. The bottle inspection machine of claim 1, wherein the number of receiving points of the closed circuit is a multiple of the number of test bottle receiving points.

3. The bottle inspection machine of claim 1, wherein the test bottle carrier has at least one recess on the periphery of the test bottle carrier, said recess permitting unhindered movement of the bottles from the inlet of the bottle inspection machine to the inspection sections and from the inspection sections to the outlet of the bottle inspection machine during said open state.

4. The bottle inspection machine of claim 1, wherein said magazine has magazine receiving points that correspond to the receiving points of the rotating bottle carriers, said magazine receiving points being configured to be driven in the same direction and in synchrony with the receiving points of said rotating test bottle carrier.

5. The bottle inspection machine of claim 4, wherein the magazine and the magazine receiving points are configured to form a circular section.

6. The bottle inspection machine of claim 1, further comprising guide rails located on the secondary conveyor section.

7. A bottle inspection machine comprising:

an inlet for bottles to be inspected;

a plurality of outlet-conveyor sections for the bottles after they have been inspected;

a plurality of inspection sections located between the inlet and the outlet-conveyor sections and arranged one behind the other, the bottles passing through said plurality of inspection sections being inspected for a variety of properties;

a plurality of rotating bottle carriers having peripheries configured as receiving points for the bottles passing through said bottle inspection machine, said plurality of rotating bottle carriers transporting the bottles through the plurality of inspection sections;

a sorting station located after a last of said plurality of inspection sections, said sorting station passing the bottles which have passed through said inspection sections to different ones of said plurality of outlet-conveyor sections depending on the results of the inspection;

said plurality of rotating bottle carriers and said sorting station forming a primary conveyor section for the bottles passing through said bottle inspection machine;

a closed circuit secondary conveyor section comprising said plurality of rotating bottle carriers and a magazine which holds a plurality of test bottles used to calibrate said bottle inspection machine;

said magazine including at least one rotating test bottle carrier having a plurality of receiving points at its periphery for holding said test bottles;

wherein said secondary conveyor section is switchable between an open state wherein said rotating test bottle carrier is disengaged from said plurality of inspection sections, and a closed state wherein said rotating test bottle carrier passes said test bottles to a first of said plurality of rotating bottle carriers and receives said test bottles from a last of said plurality of rotating bottle carriers of said primary conveyor section thereby bypassing said sorting station, the test bottle receiving points and the receiving points of the plurality of rotating bottle carriers forming a continuous chain of receiving points for the test bottles in said closed state, and further comprising:

resettable switches which are arranged in the inspection sections at transfer points to the secondary conveyor section, said resettable switches having at least four positions, wherein, in a first position, the test bottles move from the secondary conveyor section to the first of said plurality of rotating bottle carriers;

in a second position, said secondary conveyor section is in the closed state;

in a third position, the test bottles move from the last of said plurality of rotating bottle carriers of said primary conveyor section to the secondary conveyor section and remain in the secondary conveyor section; and in a fourth position, said secondary conveyor section is in the open state.

8. The bottle inspection machine of claim 7, wherein the switches are configured to be pivoted into a fifth position, in which the test bottles are held in the secondary conveyor section.

9. The bottle inspection machine of claim 7, wherein each of said switches comprises two parts that are arranged one behind the other in the direction in which the test bottles move, said switches being configured to be reset independently of each other, and being pivoted about a fixed point of rotation.

10. The bottle inspection machine of claim 7, wherein guide surfaces of the switches that face said secondary conveyor section have a curvature that is identical to a curvature of the secondary conveyor section; and wherein guide surfaces of the switches that face said inspection sections have a curvature that is identical to the curvature of the inspection sections.

11. The bottle inspection machine of claim 7, further comprising fixed guides located near transfer points from the inspection sections to the secondary conveyor section, said fixed guides facilitating transfer of the test bottles between the inspection sections and the secondary conveyor section.

12. A bottle inspection machine comprising:

an inlet for bottles to be inspected;

a plurality of outlet-conveyor sections for the bottles after they have been inspected;

a plurality of inspection sections located between the inlet and the outlet-conveyor sections and arranged one behind the other, the bottles passing through said plurality of inspection sections being inspected for a variety of properties;

a plurality of rotating bottle carriers having peripheries configured as receiving points for the bottles passing through said bottle inspection machine, said plurality of rotating bottle carriers transporting the bottles through the plurality of inspection sections;

a sorting station located after a last of said plurality of inspection sections, said sorting station passing the bottles which have passed through said inspection sections to different ones of said plurality of outlet-conveyor sections depending on the results of the inspection;

said plurality of rotating bottle carriers and said sorting station forming a primary conveyor section for the bottles passing through said bottle inspection machine;

a closed circuit secondary conveyor section comprising said plurality of rotating bottle carriers and a magazine which holds a plurality of test bottles used to calibrate said bottle inspection machine;

said magazine including at least one rotating test bottle carrier having a plurality of receiving points at its periphery for holding said test bottles;

wherein said secondary conveyor section is switchable between an open state wherein said rotating test bottle carrier is disengaged from said plurality of inspection sections, and a closed state wherein said rotating test bottle carrier passes said test bottles to a first of said plurality of rotating bottle carriers and receives said test bottles from a last of said plurality of rotating bottle carriers of said primary conveyor section thereby bypassing said sorting station, the test bottle receiving points and the receiving points of the plurality of rotating bottle carriers forming a continuous chain of receiving points for the test bottles in said closed state, and further comprising:

an automatic control system having a bottle barrier located at the inlet and a power control system, said power control system being configured to reduce the power of the inspection machine after activation of the bottle barrier; and a throughput control located at an output of the outlet-conveyor sections, said throughput control being configured to sends a first signal to the automatic control system in the absence of a flow of bottles, wherein, in response to said first signal, said automatic control system initiates introduction of test bottles from the magazine to the first of said plurality of rotating bottle carriers and switches said secondary conveyor section to the closed state, and after at least one single passage of the test bottles in the closed state, said automatic control system initiates removal of the test bottles from said plurality of rotating bottle carriers back into the magazine, after which the automatic control system opens the bottle barrier and sends a second signal to the power control system to increase the power of the machine.

13. The bottle inspection machine of claim 12, wherein the automatic control system disengages said magazine from said plurality of rotating bottle carriers after said magazine has been refilled with said test bottles received from the last of said plurality of rotating bottle carriers.

* * * * *